US010162635B2

(12) United States Patent
Gschwind

(10) Patent No.: US 10,162,635 B2
(45) Date of Patent: *Dec. 25, 2018

(54) CONFIDENCE-DRIVEN SELECTIVE PREDICATION OF PROCESSOR INSTRUCTIONS

(71) Applicant: International Business Machines Corporation, Armonk, NY (US)

(72) Inventor: Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/156,844

(22) Filed: May 17, 2016

(65) Prior Publication Data

US 2016/0259643 A1 Sep. 8, 2016

Related U.S. Application Data

(63) Continuation of application No. 13/666,407, filed on Nov. 1, 2012, now Pat. No. 9,389,868.

(51) Int. Cl.
*G06F 9/30* (2018.01)
*G06F 9/38* (2018.01)

(52) U.S. Cl.
CPC ........ *G06F 9/30058* (2013.01); *G06F 9/3017* (2013.01); *G06F 9/30072* (2013.01); *G06F 9/3802* (2013.01); *G06F 9/3844* (2013.01)

(58) Field of Classification Search
CPC .................................................. G06F 9/30058
See application file for complete search history.

(56) References Cited

U.S. PATENT DOCUMENTS

| 5,687,360 | A | 11/1997 | Chang |
| 6,092,187 | A | 7/2000 | Killian |
| 6,629,238 | B1 | 9/2003 | Arora et al. |
| 7,085,919 | B2 | 8/2006 | Grochowski et al. |
| 7,143,270 | B1 * | 11/2006 | Rudd ................. G06F 9/30072 712/227 |
| 7,178,011 | B2 | 2/2007 | Seal et al. |

(Continued)

OTHER PUBLICATIONS

"U.S. Appl. No. 13/666,407 Final Office Action", dated Oct. 20, 2015, 27 pages.

(Continued)

*Primary Examiner* — Benjamin P Geib
*Assistant Examiner* — William V Nguyen
(74) *Attorney, Agent, or Firm* — DeLizio Law, PLLC

(57) ABSTRACT

An apparatus includes a network interface, memory, and a processor. The processor is coupled with the network interface and memory. The processor is configured to determine that an instruction instance is a branch instruction instance. Responsive to a determination that an instruction instance is a branch instruction instance, the processor is configured to obtain a branch prediction for the branch instruction instance and a confidence value of the branch prediction. The processor is further configured to determine that the confidence for the branch prediction is low based on the confidence value, and responsive to such a determination, generate predicated instruction instances based on the branch instruction instance.

17 Claims, 4 Drawing Sheets

(56) References Cited

U.S. PATENT DOCUMENTS

| | | | |
|---|---|---|---|
| 7,380,110 | B1 | 5/2008 | Nuckolls et al. |
| 7,523,298 | B2 | 4/2009 | Gschwind |
| 7,565,631 | B1* | 7/2009 | Banerjee ............ G06F 17/5045 |
| | | | 716/103 |
| 8,037,288 | B2 | 10/2011 | Glew |
| 2001/0042195 | A1* | 11/2001 | Kling ................. G06F 9/30072 |
| | | | 712/226 |
| 2002/0029357 | A1 | 3/2002 | Charnell et al. |
| 2007/0061554 | A1 | 3/2007 | Worrell |
| 2007/0239974 | A1 | 10/2007 | Park et al. |
| 2008/0295105 | A1 | 11/2008 | Ozer et al. |
| 2009/0063831 | A1 | 3/2009 | Ekman |
| 2009/0150657 | A1* | 6/2009 | Gschwind ............ G06F 9/3802 |
| | | | 712/239 |
| 2009/0172371 | A1* | 7/2009 | Joao ..................... G06F 9/3842 |
| | | | 712/240 |
| 2009/0210663 | A1* | 8/2009 | Sartorius ............. G06F 9/3804 |
| | | | 712/207 |
| 2009/0271772 | A1 | 10/2009 | Stephenson et al. |
| 2011/0320792 | A1 | 12/2011 | Bonanno et al. |
| 2012/0191950 | A1* | 7/2012 | Gonion ............... G06F 9/30036 |
| | | | 712/214 |
| 2014/0122836 | A1 | 5/2014 | Gschwind et al. |

OTHER PUBLICATIONS

"U.S. Appl. No. 13/666,407 Office Action", dated May 8, 2015, 26 Pages.

Kim, et al., "Wish Branches: Combining Conditional Branching and Predication for Adaptive Predicated Execution", IEEE publication, 2005, pp. 1-12.

Kim, et al., "Wish Branches: Enabling Adaptive and Aggressive Predicated Execution", Published the IEEE Computer Society, 2006, pp. 48-58.

Co-pending U.S. Appl. No. 13/666,407, filed Nov. 1, 2012, 37 pages.

* cited by examiner

CONFIDENCE-DRIVEN SELECTIVE PREDICATION OF PROCESSOR INSTRUCTIONS

RELATED APPLICATIONS

This application is a Continuation of and claims the priority benefit of United States of America application Ser. No. 13/666,407 filed Nov. 1, 2012.

BACKGROUND

Embodiments of the inventive subject matter generally relate to the field of processor design, and, more particularly, to dynamic conversion of instructions to predicated instructions in response to a branch prediction confidence level.

Increases in processor speed alone are not sufficient to keep up with the demand for higher performance computers. Processor designers look for further optimizations to increase the efficiency of a processor. For example, processor designers may design processors with multiple cores, more memory or longer pipelines. One particular source of processor inefficiency is the conditional branch. Simple processors do not know whether a branch will be taken until the branch instruction is executed, thus do not know which set of instructions to fetch and put into the pipeline following the branch instruction. Because it takes multiple processor cycles to execute an instruction, certain components of the processor sit idle until the branch instruction is executed.

Branch prediction and instruction predication are two techniques that help reduce these inefficiencies. Branch prediction allows the processor to guess which branch will be taken based on a history of that particular branch. Branch predication allows all related instructions to be put into the pipeline, and only executing or using the result of the instructions that correspond to the result of the branch instruction execution. But both of these techniques have their limitations, with each being more efficient than the other in certain scenarios.

SUMMARY

Embodiments of the inventive subject matter include a method that allows for predication of instruction instances based on a branch instruction. A processor determines that an instruction instance is an instance of a branch instruction, and responsive to such a determination, obtain a branch prediction for the branch instruction and a confidence value of the branch prediction. The processor determines that confidence for the branch prediction is low based on the confidence value, and responsive to such a determination, generates predicated instruction instances based on the branch instruction instance.

Embodiments of the inventive subject matter include a computer program product. The computer program product includes a computer readable storage medium having computer usable program code. The computer usable program code is configured to determine whether the probability that predicated instructions will be more efficient than branch prediction is high. Responsive to a determination that the probability that predicated instructions will be more efficient than branch prediction is high, the computer usable program code is configured to determine a set of non-predicated instructions eligible to be converted to predicated instructions. After the determination of the set of non-predicated instructions eligible to be converted to predicated instructions, the computer usable program code is configured to convert the set of non-predicated instructions into predicated instructions.

Embodiments of the inventive subject matter include a processor. The processor includes a branch prediction unit configured to receive an indication of a branch instruction, predict whether the branch associated with the branch will be taken, and determine a confidence level associated with the prediction. The prediction is referred to as a branch prediction. The processor also includes an instruction fetch unit configured to receive a branch prediction and a confidence level associated with the branch prediction. The instruction fetch unit determines whether the confidence level exceeds a threshold, and indicates that an instruction is to be converted to a predicated instruction. A confidence level that exceeds the threshold is a high confidence level. The processor also includes an instruction decoder that is configured to convert non-predicated instructions to predicated instructions.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
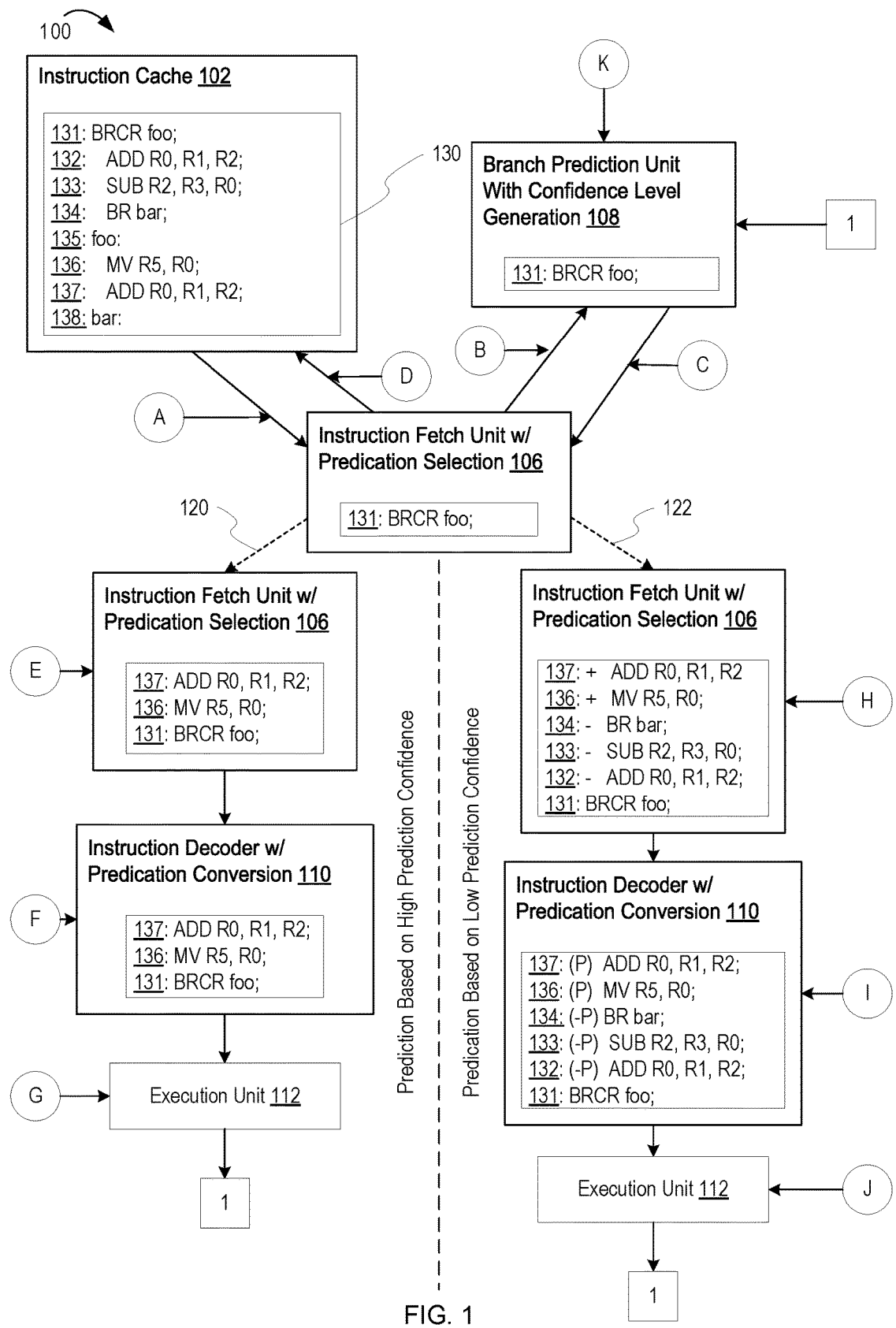
FIG. 1 depicts an example conceptual diagram illustrating selected components of a microprocessor system interacting to dynamically choose either branch prediction or instruction predication based on a branch prediction confidence level.

The description that follows includes exemplary systems, methods, techniques, instruction sequences and computer program products that embody techniques of the present inventive subject matter. However, it is understood that the described embodiments may be practiced without these specific details. For instance, although examples refer to individual process components, such as an instruction fetch unit and an instruction decoder, these may not be distinct components in some implementations. Additionally, examples refer to definitions of instructions. Although they may be derived from actual implementations, they have been simplified to facilitate the description of the art, and actual implementations vary greatly. In other instances, well-known instruction instances, protocols, structures and techniques have not been shown in detail in order not to obfuscate the description.

A processor operates on instructions in a linear fashion. The processor loads instructions from memory into cache memory, such as an instruction cache. Within the processor, the individual instructions go through several stages, including instruction fetch, instruction decode, and execution. This is called the pipeline, and commonly ranges from two to thirty stages.

One goal of a pipelined processor is to have an instruction in each stage of the pipeline at a time. Although this works well for a purely linear program, most programs have branch instructions. Branch instructions allow a program to jump to a different point in the program instead of running linearly. Conditional branch instructions allow a program to branch based on a specific condition, such as the value of a register. If the branch condition is true, one branch is taken, but if the branch condition is false, the other branch is taken. Conditional branch instructions create a problem with a pipelined processor because the processor has not typically calculated the value of the branch condition until it is executed. The execution unit is usually towards the end of the pipeline, thus the processor does not know which instruction will come after the branch instruction. The processor delays adding instructions into the pipeline until the branch condition has been calculated, and thus the next instruction, is determined. The delay leads to significant inefficiencies caused by each branch instruction. Branch prediction can help reduce these inefficiencies.

To implement branch prediction, processor designers typically add an additional hardware component to the processor, called the branch prediction unit. The branch prediction unit tracks which branch of a conditional branch is taken, allowing the processor to guess which branch will be taken the next time, based on which branch has been taken most frequently. When the prediction is correct, branch prediction significantly reduces inefficiencies caused by branches. But if the prediction is incorrect, the inefficiencies created can be worse than the inefficiencies if branch prediction was not used. Although both conditional and non-conditional branches exist, the current discussion is concerned with conditional branches. For this reason, the term "branch" will refer to a conditional branch hereinafter.

Processor designers can also use instruction predication to reduce inefficiencies. Instruction predication allows each instruction to have a predicate condition which determines if the instruction is run or the instruction result used. Instead of using a branch, a programmer or compiler uses the branch condition ("condition") as a predicate for the instructions associated with one branch. The negation of the condition is then used as a predicate for the instructions of the other branch. Branch predication allows a processor to put both sets of instructions into the processor pipeline. In some scenarios, the value of the condition, and hence the predicate, is ascertainable before the execution of the predicated instructions. In these scenarios, the execution unit can discard, or not execute any instruction with a predicate that does not match the value of the condition. In other scenarios, the value of the condition may not be ascertainable prior to the execution of some, or all, or the predicated instructions. In these scenarios, the results of the two different sets of instructions can be stored in registers, and the valid result selected when the value of the condition is ascertainable.

Instruction predication avoids the inefficiencies associated with branch misprediction, but the processor executes instructions that will not be used, leading it to do work that is unnecessary. Instruction predication introduces inefficiencies that are present each time instruction predication is used, whereas branch prediction inefficiencies only occur with a branch misprediction. The result is that a successful branch prediction is the most efficient, but instruction predication is more efficient than a branch misprediction.

Although processor implementations exist that implement predicated instructions, they either convert all branch instructions into predicated instructions or require the programmer or compiler to create the predicated instructions prior to the program being assembled. Because branch prediction in modern processors is generally accurate (with some implementations having greater than a ninety percent accuracy rate), it is rarely advantageous to always convert branch instructions to predicated instructions. Implementations that allow a programmer or compiler to use predicated instructions as an alternative to branch instructions provide greater flexibility. But owing to the dynamic nature of software programs and associated data, it is difficult to know whether predicated instructions will be more efficient.

A processor can be designed to mitigate the inefficiencies created by branch misprediction by dynamically selecting instructions to convert to predicated instructions. Branch instruction logic with confidence level generation ("branch prediction unit") provides a confidence level with each prediction made. If this confidence level is under a certain threshold, signifying low confidence in the prediction, the processor converts the branch into predicated instructions. Using predication when prediction confidence is low allows the processor to take advantage of the greater efficiency predicated instructions provide over a branch misprediction in instances where a misprediction is likely.

For a processor that implements branch prediction, the branch prediction unit is notified of whether the branch is taken or not. This allows the branch prediction unit to keep a history of whether the branch is taken or not. This may be accomplished by the execution unit or other hardware sending the branch identifier and result to the branch prediction unit. This may also be accomplished by the branch prediction unit checking the value in a register designated to host the result after the value the conditional branch relies on is determined.

FIG. 1 depicts an example conceptual diagram illustrating selected components of a microprocessor system interacting to dynamically choose either branch prediction or instruction predication based on a branch prediction confidence level. FIG. 1 depicts a microprocessor system 100 including an instruction cache 102, an instruction fetch unit with predication selection ("instruction fetch unit") 106, a branch prediction unit with confidence level generation ("branch prediction unit") 108, an instruction decoder with predication conversion ("instruction decoder") 110, and an execution unit 112. The instruction cache 102 includes a set of instructions 130 representing a portion of a software program. The set of instructions 130 includes instructions 131, 132, 133, 134, 136 and 137. The set of instructions 130 also includes two labels 135 and 138, reflective of a branch target address. The instruction fetch unit 106, branch prediction unit 108, and instruction decoder 110 each include a subset of the set of instruction 130 at various states. The instructions 130 in the instruction cache 102 are depicted in order from top to bottom. The instructions in the other components are depicted in the order they progress down each path. The dashed arrow 120 indicates the scenario where the microprocessor system 100 uses branch prediction based on a high prediction confidence. The dashed arrow 122 indicates the scenario where the microprocessor system 100 uses instruction predication based on a low prediction confidence.

The instruction cache 102 is a form of cache memory reserved for instructions. The microprocessor system 100 reads instructions, such as the set of instructions 130 depicted in the instruction cache 102, from memory and writes them into the instruction cache 102. The instructions are held there until consumed by the microprocessor system 100.

At stage A, the instruction fetch unit 106 fetches an instruction 131 from the instruction cache 102. The instruction 131 is a hypothetical branch instruction with the abbreviation "BRCR." The BRCR instruction is defined as instructing the microprocessor system 100 to branch to the label indicated by the sole parameter to the BRCR instruction if a condition register located in the microprocessor system 100 is set to the value 1. If the condition register is not set to the value 1, the instructions immediately after the BRCR instruction are executed. The BRCR instruction can be compared to the "BR" instruction 134, which is an unconditional branch. Thus, if the BR instruction 134 is executed, the branch to the label 138 is always taken. Although the instruction decoder 110 does most of the instruction decoding, other components may also do some decoding. For example, either the instruction cache 102 or instruction fetch unit 106 may determine if an instruction is a branch instruction. This allows the instruction fetch unit 106 to send the branch instruction to the branch prediction unit 108, making the branch prediction available for use sooner.

At stage B, the instruction fetch unit 106 has determined that the instruction 131 is a branch instruction and sends the instruction to the branch prediction unit 108. The branch prediction unit 108 predicts whether the branch will be taken or not by looking at the history for that branch (i.e., the target as identified by the label foo). Although there are a variety of techniques used to accomplish this, one technique that is useful for illustrative purposes uses a two-bit saturating counter for each branch. The two-bit saturating counter allows the branch prediction unit to track four states for each branch: "strongly not taken," "weakly not taken," "weakly taken," and "strongly taken." If the branch prediction unit indicates a particular branch state is set to "weakly not taken," the next time that branch is taken the state is changed to "weakly taken." If the branch is subsequently taken again, the state is changed to "strongly taken." Each time the branch is not taken, the state shifts in the other direction until it becomes "strongly not taken," on which it remains until the branch is taken. The branch prediction unit 108 also determines a confidence level for the prediction, such that the more frequently the branch is taken or not taken the higher the confidence level. With the above example of a two bit saturating counter, "weakly" corresponds to a low confidence level, and "strongly" corresponds to a high confidence level.

When the branch prediction unit 108 receives an instruction from the instruction fetch unit 106, the branch prediction unit 108 checks the history for that particular branch. If no history exists, as when the branch has not been taken before, the branch prediction unit 108 sets it to a default value. If the history indicates that the branch is likely to be taken, the branch prediction unit 108 notifies the instruction fetch unit 106 that the branch is predicted to be taken. Otherwise, the branch prediction unit 108 notifies the instruction fetch unit 106 that the branch is predicted to not be taken. Additionally, the branch prediction unit 108 notifies the instruction fetch unit 106 of the confidence level associated with the prediction.

At stage C, the branch prediction unit 108 has predicted whether the branch instruction 131 will result in the branch being taken or not. The branch prediction unit 108 has also established a confidence level. The branch prediction unit 108 sends the prediction as well as the confidence level to the instruction fetch unit 106. The instruction fetch unit 106 determines if the confidence level associated with the branch prediction is high or low.

At stage D, the instruction fetch unit 106 has determined whether the confidence level sent from the branch prediction unit 108 is high or low. The instruction fetch unit 106 then fetches the proper set of instructions. If the confidence level is determined to be high, the instruction fetch unit 106 fetches the instructions associated with the branch prediction from the instruction cache 102 and proceeds down the path beginning with stage E. If the confidence level is determined to be low, the instruction fetch unit 106 fetches the instructions associated with both taking the branch and not taking the branch from the instruction cache 102 and proceeds down the path beginning with stage H. In this example, if the confidence level is high and the branch is predicted to be taken, the instruction fetch unit 106 would fetch the instructions 136 and 137 that follow the label 135 specified by the branch instruction 131. If the confidence level is high and the branch is predicted not to be taken, the instruction fetch unit 106 would fetch the instructions 132 and 133 immediately following the branch instruction 131. If the confidence level is low, the instruction fetch unit 106 would fetch both sets of instructions 132, 133, 134, 136, and 137.

At stage E, the instruction fetch unit 106 has determined that the branch prediction confidence level is high, and that the branch was predicted to be taken. The branch instruction 131 specified the label "foo" 135. Thus, the instruction fetch unit 106 fetches the instructions 136 and 137 that follow the label "foo" 135. After fetching the instructions, the instruction fetch unit 106 sends the instructions to the instruction decoder 110.

At stage F, the branch instruction and associated instructions 136 and 137 have flowed through to the instruction decoder 110. Although instructions might typically flow from the instruction fetch unit 106 to the instruction decoder 110 individually, they are depicted as a single block to simplify the illustration. In a typical implementation, the instruction decoder 110 would generally decode the instructions, determine the type of parameters specified, break down complex instructions into simpler instructions, etc., but this has not been illustrated.

At stage G, the execution unit 112 executes the instructions 131, 136, and 137. When branch prediction is used, the instructions for the predicted branch are executed as normal instructions. In this particular example, the execution unit 112 executes the branch instruction 131 by reading the value of the condition register. If the value of the condition register is set to 1, the branch is taken and the results of the instructions 136 and 137 are used. If the value of the condition register is set to 0, the branch was not taken, and thus the results of the instructions 136 and 137 are discarded. The microprocessor 100 then fetches the other instructions, incurring a misprediction penalty.

At stage H, the instruction fetch unit 106 has fetched the instructions 132, 133, 134, 136, and 137. This was done subsequent to the instruction fetch unit 106 determining the confidence level in the branch prediction from the branch prediction unit 108 was low at stages C and D. At stage H, the instruction fetch unit 106 flags the instructions 132, 133, 134, 136, and 137 with metadata to indicate that the instructions are to be converted into predicated instructions. In FIG. 1, the metadata is represented by the positive and negative symbols with the instructions 132, 133, 134, 136, and 137. A positive symbol indicates that the instruction is to have a predicate equivalent to the branch instruction 131 condition. The negative symbol indicates that the instruction is to have the negation of the branch instruction 131 condition as a predicate.

At stage I, the instructions 131, 132, 133, 134, 136, and 137 have flowed from the instruction fetch unit 106 to the instruction decoder 110. During the decode process, the instruction decoder 110 reads the metadata indicating that the instructions 132, 133, 134, 136, and 137 are to be converted to predicated instructions. Using the associated branch instruction 131, the instruction decoder 110 adds the predicate to the instructions 136 and 137, identified by "(P)". The instruction decoder 110 adds the negated predicate to the instructions 132, 133, and 134 identified by "(-P)". Because the branch instruction 131 itself is not needed, the instruction decoder 110 converts the branch instruction 131 to an instruction that ensures the result of the condition is sent to the branch prediction unit 108 in order to update the predictor with the branch condition.

In some embodiments, the unconditional branch instruction 134 can be discarded either at this stage or the previous stage. In this example, because all instructions between the unconditional branch instruction 134 and the memory address that is branched to (represented by the "bar" label 138) constitute one single branch, the result of the predication is the same as the branch instruction. In other words, if the predicate value is such that the unconditional branch instruction 134 is executed, no instruction between the unconditional branch instruction 134 and the related label 138 will be executed. Some embodiments may still rely on the unconditional branch instruction 134 even in scenarios like that depicted in FIG. 1, and may not be able to drop the unconditional branch instruction 134.

At stage J, the instructions 132, 133, 134, 136, 137 and converted branch instruction 131 have flowed through to the execution unit 112. If the execution unit 112 has computed the value of the condition at the time the instructions 132, 133, 134, 136, and 137 are executed, the execution unit simply ignores instructions that have a false predicate. For example, if the condition register is set to the value 1, the predicate "(P)" will be true because the branch instruction 131 condition would have been true. Thus, the instructions 132, 133 and 134 that had the "(-P)" predicate would simply be ignored. If the condition register is set to the value 0, the opposite would hold true and instructions marked with the "(-P)" predicate would not be ignored. In some scenarios, the execution unit 112 has not computed the value of the condition at the time the instructions 132, 133, 134, 136, and 137 are executed. In these scenarios, the execution unit 112 executes both sets of instructions, storing their results in separate registers. Once the value of the condition has been computed, the valid result is placed in the location it would have been if executed normally, while the invalid result is discarded or ignored.

At stage K, the execution unit 112 has sent the results of the branch condition to the branch prediction unit 108. As discussed above, the information used to identify the branch in the branch prediction unit 108 can vary between implementations. In some implementations, the branch is identified by sending the branch instruction 131 to the branch prediction unit 108. In some implementations, the branch may be identified by the thread identifier associated with the currently running thread and the branch instruction memory address. The branch prediction unit 108 uses the information identifying the branch to update the branch history. Referring back to the two-bit saturating counter described above, this would involve changing the state stored in the counter associated with the branch. For example, if the counter was set to "weakly taken," and the branch was taken, the counter would be changed to "strongly taken." When the instruction predication path 122 is taken, the branch instruction 131 may continue through to the execution unit 112 as shown in FIG. 1. In some embodiments, allowing a branch instruction to flow through to the execution unit 112 may require additional modifications preventing the hardware from processing the branch instruction normally when instruction predication is used. To avoid this, some embodiments can discard the branch instruction and use another instruction that instructs the microprocessor system 100 to send the branch identifying information to the branch prediction unit 108 along with the result of the branch condition. The branch condition can either be embedded in the replacement instruction or can be derived from the predicate of one of the predicated instructions 136 and 137.

In some embodiments, predication conversion can be performed by inserting "selection instructions," instead of modifying existing instructions to include a predicate. A predicate-select (PSEL) instruction includes two source parameters and a destination parameter. When executed, the execution unit 112 determines the value of the current predicate, either by checking the value of a register designated to contain the value of the predicate or evaluating the predicate at the time the PSEL instruction is executed. If the predicate evaluates to true, one of the two source registers is selected. If the predicate evaluates to false, the other source register is selected. Once the execution unit 112 determines the correct source, the execution unit 112 executes an instruction moving the value in the source register to the destination register.

The below example set of instructions shows predication conversion with the PSEL instruction, The set of instructions in the instruction decoder 110 at stage I would have a PSEL instruction added after each instruction, as illustrated in Table 1. The unconditional branch instruction 134 has been removed and the instructions are presented in reverse order as in FIG. 1 stage I.

TABLE 1

| |
|---|
| 137b: PSEL eR, R2, R2; |
| 137a: ADD R0, R1, eR; |
| 136b: PSEL eR, R0, R0 |
| 136a: MV R5, eR; |
| 133b: PSEL R0, eR, R0; |
| 133a: SUB R2, R3, eR; |
| 132b: PSEL R2, eR, R2; |
| 132a: ADD R0, R1, eR; |
| 131: BRCR foo; |

In this example, the first parameter to the PSEL instruction is the source register if the predicate evaluates to true, the second parameter to the PSEL instruction is the source register if the predicate evaluates to false, and the third parameter is the destination register.

As illustrated in Table 1, the original instructions 132, 133, 136, and 137 are modified such that any result is stored in a temporary register, identified by "eR". For example, the ADD instruction 132 was modified to change the destination register from "R2" to "eR". Thus, the modified ADD instruction 132a does not modify a general purpose register. If the execution unit 112 determines that the predicate evaluates to true when executing the first PSEL instruction 132b, the execution unit 112 executes an instruction copying the value in the first source register, R2, to the destination register, R2. Because the modified ADD instruction 132a does not change R2 as the original ADD instruction 132 did, and the PSEL instruction 132b merely copies the current value in R2 back into R2, no values are changed. Thus, if the predicate evaluates to true, the result is the same as if instructions 132a and 133a associated with the negation of the predicate do not execute. The results of the instructions 136a and 137a associated with the non-negated predicate, on the other hand, are copied into the destination registers specified by the original instructions 136 and 137.

Figure 2:
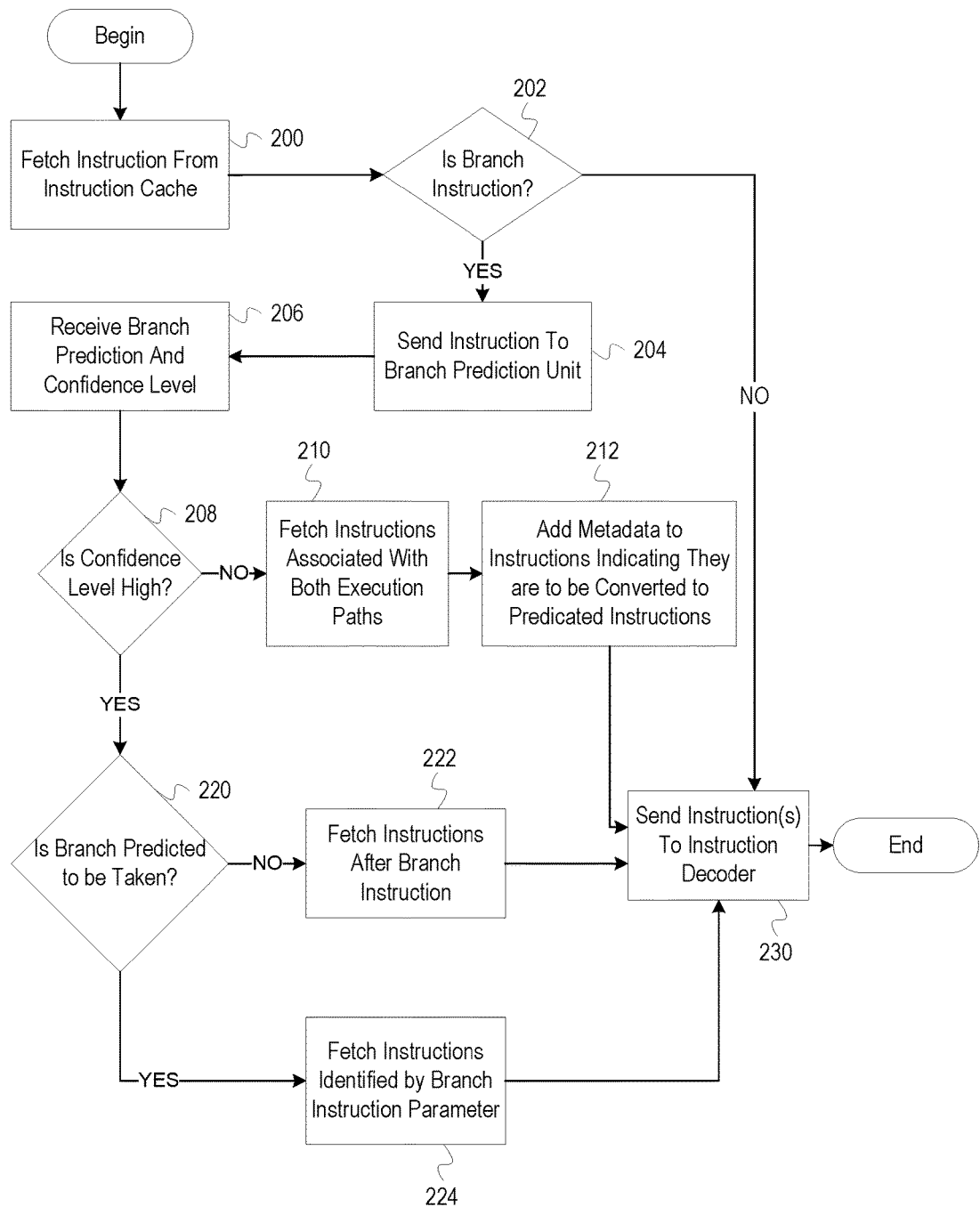
FIG. 2 depicts a flowchart of example operations showing how an instruction fetch unit might process branch instructions.

FIG. 2 depicts a flowchart of example operations showing how an instruction fetch unit might process branch instructions. As an example flowchart, FIG. 2 presents operations in an example order from which embodiments can deviate (e.g., operations can be performed in a different order than illustrated and/or in parallel).

At block 200, the instruction fetch unit fetches an instruction from the instruction cache. Control then flows to block 202.

At block 202, the instruction fetch unit determines if the instruction fetched at block 200 is a branch instruction. This typically involves a partial decode of the instruction so that the instruction fetch unit can determine what the instruction opcode is. If the instruction is a branch instruction, control then flows to block 204. If the instruction is not a branch instruction, control then flows to block 230.

At block 204, the instruction fetch unit sends the instruction to the branch prediction unit. This allows the branch prediction unit to check the history of the particular branch instruction, providing a prediction as to whether the branch will be taken or not. In some embodiments, a subset of the instruction or other identifying information may be sent to the branch prediction unit. For example, the branch prediction unit may use only the thread identifier and memory address of the branch to identify which branch instruction has been fetched. Thus, the full instruction may not be needed. Control then flows to block 206.

At block 206, the instruction fetch unit receives the prediction from the branch prediction unit for the instruction sent to the branch prediction unit at block 204. The branch prediction unit also provides a confidence level with the prediction. The confidence level may take a variety of forms. For example, the confidence level can simply be the two-bit state from a two-bit saturating counter as discussed above. The confidence level can be a binary representation of an integer indicating a percentage, or be a single bit representing a low or high confidence level as determined by the branch prediction unit itself. Control then flows to block 208.

At block 208, the instruction fetch unit determines if the confidence level is high. The specific implementation will vary based on the value sent from the branch prediction unit at block 206. For example, if the confidence level is a single bit representing a high or low confidence level, the instruction fetch unit may simply use the confidence level bit to select a particular path through the instruction fetch unit logic. If the confidence level is a binary representation of an integer indicating a percentage, the instruction fetch unit may compare the confidence level with a threshold value ("predication selection threshold"). The predication selection threshold can be set based on profile information, execution history of the program, etc. In addition, a programmer/developer can explicitly set the predication selection threshold within the program itself. Whether guided by developer knowledge, profiling, execution history, etc., the predication selection threshold can be adjusted to an appropriate level for expected/previously observed program behavior. For example, when sorting random data, the branch prediction unit may have difficulty predicting branches. If a software program is sorting random data, it could set the predication selection threshold higher, so that predicated instructions will be used more often. As the data is sorted, the software program can lower the confidence level, or set it to the default value. An architecture can specify a register to host the selection predication threshold, a general register can be reserved for the selection predication threshold, etc. If the instruction fetch unit determines the confidence level is low, control then flows to block 210. If the instruction fetch unit determines the confidence level is high, control then flows to block 220.

At block 210, the instruction fetch unit fetches the instructions associated with the both possible instruction execution paths. Because the confidence level of the prediction is low, as determined by the instruction fetch unit at block 208, the overall efficiency of the processor can be increased by converting the associated instructions to predicated instructions instead of risking a branch misprediction. In order to convert the associated instructions to predicated instructions, the instruction fetch unit fetches two sets of instructions. The first set of instructions is the set of instructions that would run if the branch was not taken, the second set is the set of instructions that would run if the branch was taken. The number of instructions in each set may vary between embodiments. Some embodiments may use a special branch instruction that, if taken, jumps over a specific number of instructions. In these embodiments, the instruction fetch unit would fetch the set of instructions containing the instructions that would be jumped over. The instruction fetch unit would also fetch the set of instructions containing a number of instructions that would be executed if the branch were taken. Control then flows to block 212.

At block 212, the instructions fetched by the instruction fetch unit at block 210 have metadata added to them that indicate to the instruction decoder that the instructions are to be converted to predicated instructions. In some embodiments, the flag will be an extra bit included with the instruction, although the specific implementation details may vary. In some embodiments, the actual conversion to predicated instructions can happen in the instruction fetch unit. Control then flows to block 230.

If the instruction fetch unit determined that the branch prediction confidence level was high at block 208, control flowed to block 220. At block 220, the instruction fetch unit determines whether the branch is predicted to be taken or not. This may be checking the value of a single bit input from the branch prediction unit. If the instruction fetch unit determines that the branch is predicted to be taken, control then flows to block 224. If the instruction fetch unit determines that the branch is predicted to not be taken, control then flows to block 222.

At block 222, the instruction fetch unit fetches the instructions for the execution path associated with not taking the branch. The instructions fetched will typically be the instructions that sequentially follow the branch instruction. Because of their proximity to the branch instruction, these instructions may have already been fetched, thus an actual fetch from memory or the instruction cache is not always required. Control then flows to block 230.

If the instruction fetch unit determined that the branch was predicted to be taken at block 220, control then flowed to block 224. At block 224, the instruction fetch unit fetches the instructions for the execution path associated with taking the branch. There are a variety of different branch instructions that permit a programmer or compiler to specify the next instruction to execute. For example, one branch instruction may have a label parameter that refers to the next instruction for that branch. Another branch instruction may direct the processor to use the value in a register as the memory address of the next instruction for that branch. Regardless of the specific instruction format and semantics, the instruction fetch unit will fetch the instructions beginning with the first instruction of the branch execution path. Subsequent instructions may also be fetched. Control then flows to block 230.

If the instruction fetch unit determined that the instruction was not a branch instruction at block 202, control then flowed to block 230. Control also flowed to block 230 after the operations in blocks 212, 222, and 224. At block 230, the instruction fetch unit sends the fetched instructions to the instruction decoder.

Although the process of decoding instructions is typically abstracted as occurring in an instruction decoder component within a processor, modern processors may not restrict all the decoding logic to one component. Processor efficiency may be increased by having certain information about a particular instruction earlier in the processor pipeline. Thus, processors can be designed such that certain aspects of the decode process can be done prior to the instruction decoder. For example, branch prediction may take multiple cycles to complete, but the processor might have to delay subsequent instructions until it gets the prediction. In order to reduce the related inefficiencies, the instruction may be decoded enough to determine if the instruction is a branch instruction prior to being inserted into the instruction cache. Metadata associated with the instruction can then be stored with the instruction and flow through the remainder of the processor. Thus, if the instruction is a branch instruction, when the instruction fetch unit fetches it out of the instruction cache, the instruction can also be sent to the branch prediction unit in parallel.

Figure 3:
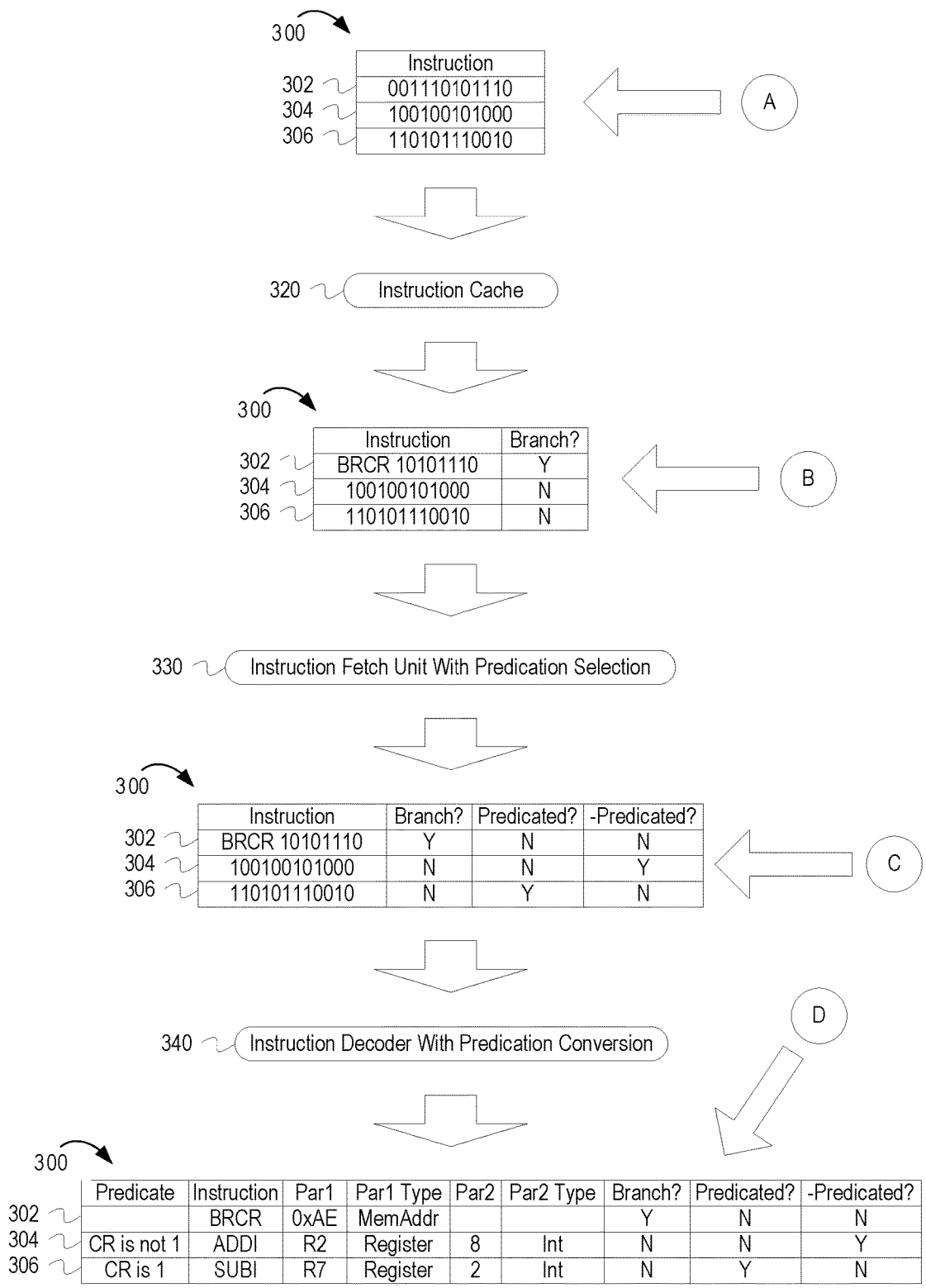
FIG. 3 depicts an example of the states of a set of instructions as they flow through various components of a microprocessor system.

FIG. 3 depicts an example of the states of a set of instructions as they flow through various components of a microprocessor system. Figure three includes a table 300, an instruction cache 320, an instruction fetch unit 330, and an instruction decoder 340. The table 300 includes rows 302, 304 and 306 corresponding to each of a set of instructions. The table 300 a subset of columns indicating various metadata about the instruction, including a predicate, instruction, first parameter ("Par1"), second parameter ("Par2"), first parameter type ("Par1 Type"), second parameter type ("Par2 Type"), whether the instructions is a branch instruction or not ("Branch?"), whether the instruction is to be converted to a predicated instruction or not ("Predicated?") and whether the instruction is to be converted to the negative predicated instruction or not ("−Predicated?"). The arrows represent the flow of the instructions through the microprocessor.

At state A, the instructions are in their most basic binary form. In this example, the instructions are twelve bits wide. The opcode is the first four bits, the first parameter is the middle four bits, and the second parameter is the last four bits. The actual number of bits per instruction varies between architectures. The ways the bits are allocated to specific components of the instruction, such as the opcode and parameters, varies as well. From state A, the instructions flow into the instruction cache 320.

At state B, the instructions have flowed into the instruction cache 320. The hardware of the instruction cache 320 has recognized that the first instruction corresponding to row 302 is a BRCR instruction, as defined above. In an actual implementation, the instruction remains in binary, but for this example decoded portions of the instruction are shown in alphabetic form. As a result of recognizing the instruction as a branch instruction, the instruction cache 320 hardware has also added a flag to the instruction indicating that it is a branch instruction. In some embodiments, this will be implemented by adding an extra bit to the instruction, setting it to 0 if it is not a branch instruction and 1 if it is a branch instruction, or vice versa. In this example, "Y" stands for "yes" and "N" stands for "no." The instruction cache 320 hardware has set the "Branch?" flag for row 302 to "Y," and the remaining "Branch?" flags to "N." After state B, the instructions flow through to the instruction fetch unit 330.

At state C, the instructions have flowed into the instruction fetch unit 320. In some embodiments, as described herein, the branch instruction is sent to a branch prediction unit as well. The branch prediction unit then sends the prediction and a confidence level to the instruction fetch unit 330. If the confidence level is low, the instruction fetch unit 330 flags the instructions associated with the branch instruction to be converted into predicated instructions. The instructions associated with taking the branch are predicated with the branch instruction condition. The instructions associated with not taking the branch are predicated with the negation of the branch instruction condition. In this particular example, the instruction corresponding to row 306 is associated with taking the branch. The instruction fetch unit 330 indicates that the instruction corresponding to row 306 is to have a predicate added to it, as indicated by the "Y" in the "Predicated?" column. The instruction corresponding to row 304 is associated with not taking the branch. The instruction fetch unit 330 indicates that the instruction corresponding to row 306 is to have the negation of the predicate added to it, as indicated by the "Y" in the "−Predicated?" column. After state C, the instructions flow through to the instruction decoder 340.

At state D, the instructions have flowed into the instruction decoder 340. The instruction decoder 340 fully decodes the instructions. For example, the instruction decoder 340 has determined the parameter value of the first parameter for the branch instruction corresponding with the first row 302, as indicated in the "Par1" column. The instruction decoder 340 has also determined that the first parameter for the branch instruction corresponding with the first row 302 is a memory address, as indicated in the "Par1 Type" column. The instruction decoder 340 decoded the parameters for the instructions corresponding with the second and third rows 304 and 306. Additionally, the instruction decoder 340 has added the predicates to the instructions corresponding to the second and third rows 304 and 306. The derivation of the predicates in the second and third rows 304 and 306 is discussed above.

Specific implementations can vary. For example, implementations can mix predicated instructions with predicate select instructions, and the number of temporary registers can vary as well. Some implementations may not permit predication or predicate select instructions for instructions that can raise exceptions. In some implementations, the exception state may be stored for processing in conjunction with a predicate select operation, and the predicate select operation may be equipped to update such state or raise an exception. As with exception states, some implementations may restrict predication or predicate select instructions for instructions that cannot modify certain aspects of the global state of the processor, while others may extend the predicate select operation to function with the modification of the global state.

The instructions discussed are defined in the ISA and can vary between different ISAs, and even between different versions of the same ISA. For example, the order of parameters to an instruction may vary, as well as the types of parameters that an instruction can handle, such as logical register identifiers and constant values. In particular, some implementations may have condition registers defined, and instructions such as conditional branches and predicate selects can be defined in such a way as to allow them to take advantage of the condition registers.

Detection of an instruction predication conversion opportunity is discussed above as occurring when a component determines that a branch prediction confidence is low. Detection of an instruction predication opportunity can also occur when an instruction is written into an instruction cache. In some implementations, when writing the instruction into an instruction cache, the instruction will be partly decoded, allowing predecode information to be stored with the instruction in the cache. Thus, the processor can begin the detection process earlier than if the partial decode occurred in an instruction fetch unit or other component. Additionally, detection of an instruction predication conversion opportunity can occur using other hardware components adapted to detect instruction predication conversion opportunities. For example, a hardware component integrated in, or coupled to a branch prediction unit can perform the detection of an instruction predication conversion opportunity. In some implementations, a BRCR instruction might contain additional metadata indicating the instruction predication opportunity. This metadata can come from various sources, such as being included explicitly by the programmer or added by a compiler. The metadata can act as a suggestion, potentially altering the processor's default behavior, or can act as an override.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
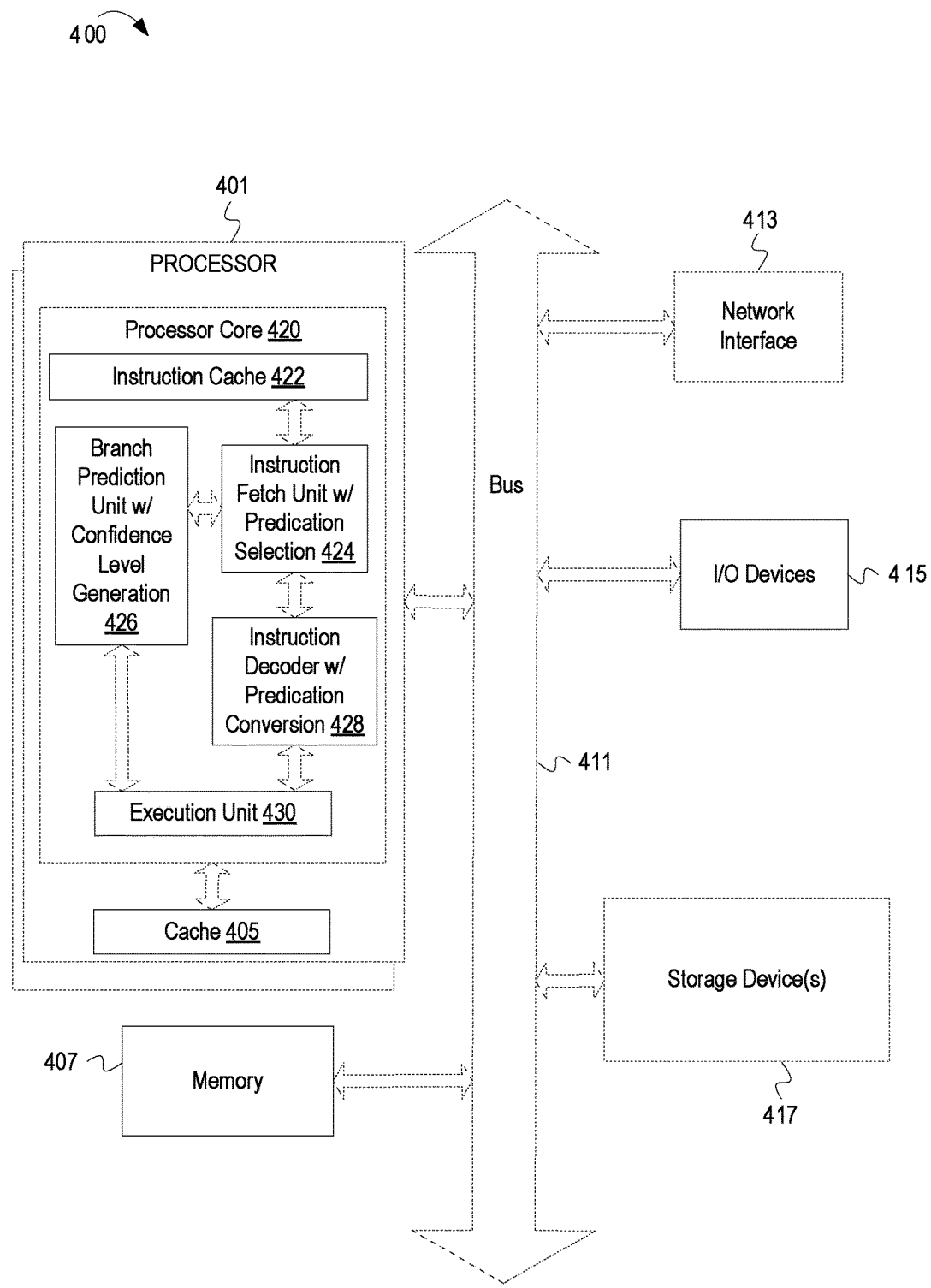
FIG. 4 depicts an example computer system with a processor core that allows for confidence level-based instruction predication.

FIG. 4 depicts an example computer system with a processor core that allows for confidence level-based instruction predication. A computer system includes a processor 401 (possibly including multiple processors, multiple cores, multiple nodes, and/or implementing multi-threading, etc.). The processor 401 includes at least one processor core 420 and at least one cache 405 (e.g., one or more of direct mapped cache, a 2-way set associative cache, a fully associative cache, etc.). The processor core 420 includes an instruction cache 422, an instruction fetch unit with predication selection 424, an instruction decoder with predication conversion 428, a branch prediction unit 426 and an execution unit 430. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 411 (e.g., PCI, ISA, PCI-Express, HyperTransport® bus, InfiniBand® bus, NuBus bus, etc.), I/O devices 415 (e.g., keyboard, mouse, monitor, microphone, speaker, etc.), a network interface 413 (e.g., an ATM interface, an Ethernet interface, a Frame Relay interface, SONET interface, wireless interface, etc.) and a storage device(s) 417 (e.g., optical storage, magnetic storage, etc.). The cache 405 may be a lower level cache (e.g., L1 cache embodied in a processor) or a higher level cache (e.g., L2 cache, L3 cache, etc.). The processor core 420, instruction fetch unit with predication selection 424, instruction decoder with predication conversion 428 and branch prediction unit 426 embody functionality to implement embodiments described above. The instruction fetch unit with predication selection 424 functions as described above, sending branch instructions to the branch prediction unit 426, receiving a confidence level and branch prediction from the branch prediction unit 426, and flagging instructions to be converted into predicated instructions. The branch prediction unit 426 functions as described above, predicting whether a branch will be taken or not, and sending the prediction along with a confidence level associated with the prediction to the instruction fetch unit with predication selection 424. The instruction decoder with predication conversion 428 functions as described above, converting instructions that are flagged by the instruction fetch unit with predication selection 424 for conversion to predicated instructions. Any one of these functionalities may be partially (or entirely) implemented in hardware and/or on the processing unit 401. For example, the functionality may be implemented with an application specific integrated circuit, in logic implemented in the processing 401, in a co-processor on a peripheral device or card, etc. Further, realizations may include fewer or additional components not illustrated in FIG. 4 (e.g., video cards, audio cards, additional network interfaces, peripheral devices, etc.). The processor 401, storage device (s) 417, network interface 413, memory 407, and I/O devices 415 are coupled to the bus 411.

While the embodiments are described with reference to various implementations and exploitations, it will be understood that these embodiments are illustrative and that the scope of the inventive subject matter is not limited to them. In general, techniques for dynamic conversion of instructions to predicated instructions in response to a branch prediction confidence level as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a first instruction instance is a first branch instruction instance;
   responsive to determining that the first instruction instance is the first branch instruction instance, obtaining a first branch prediction for the first branch instruction instance and a first confidence level of the first branch prediction, wherein the first branch prediction and the first confidence level are based, at least in part, on a history of branch executions for a program that comprises the first branch instruction instance;
   determining that the first confidence level is below a threshold;
   before executing the first branch instruction instance and responsive to determining that the first confidence level is below the threshold, fetching one or more instructions of the first branch instruction instance and converting the one or more instructions to predicated instruction instances, wherein the predicated instruction instances include at least a first instruction execution path associated with a first predicate and a second instruction execution path associated with a second predicate, wherein converting the one or more instruction comprises adding metadata to the one or more instructions before sending the one or more instructions to an instruction decoder, the metadata to cause the instruction decoder to convert the one or more instructions to the predicated instruction instances;
   ascertaining a value of a condition before execution of the predicated instruction instances; and
   determining whether to execute the first instruction execution path or the second instruction execution path based, at least in part, on whether the first predicate or the second predicate matches the value of the condition.

2. The method of claim 1, wherein the threshold is based, at least in part, on the history of branch executions.

3. The method of claim 1, further comprising:
   keeping the history of branch executions, wherein the history indicates whether the first branch instruction instance was previously taken.

4. The method of claim 1,
   wherein fetching the one or more instructions comprises fetching one or more instructions of the first instruction execution path and one or more instructions of the second instruction execution path, the first instruction execution path and the second instruction execution path associated with the first branch instruction instance; and
   wherein converting the one or more instruction comprises converting the one or more instructions of the first instruction execution path and the one or more instructions of the second instruction execution path to the predicated instruction instances.

5. The method of claim 1, wherein converting comprises one member of the group consisting of:
   adding the first predicate to one or more instructions of the first instruction execution path and adding the second predicate to one or more instructions of the second instruction execution path; and inserting selection instructions between each of the one or more instructions of the first instruction execution path and inserting selection instructions between each of the one or more instructions of the second instruction execution path.

6. The method of claim 1, further comprising:
responsive to determining that the first confidence level is higher than the threshold, fetching one or more instructions of a predicted instruction execution path.

7. The method of claim 1, further comprising:
determining that a second instruction instance is a second branch instruction instance;
responsive to determining that the second instruction instance is the second branch instruction instance, obtaining a second branch prediction for the second branch instruction instance and a second confidence value of the second branch prediction;
determining a second confidence level for the second branch prediction based on the second confidence value; and
responsive to determining that the second confidence level is high, executing a third set of instructions that correspond to the second branch prediction.

8. A computer program product comprising:
a non-transitory computer readable storage medium having computer usable program code embodied therewith, the computer usable program code configured to:
determine that a first instruction instance is a first branch instruction instance;
responsive to a determination that the first instruction instance is the first branch instruction instance, obtaining a first branch prediction for the first branch instruction instance and a first confidence level of the first branch prediction, wherein the first branch prediction and the first confidence level are based, at least in part, on a history of branch executions for a program that comprises the first branch instruction instance;
determine that the first confidence level is below a threshold;
before executing the first branch instruction instance and responsive to determining that the first confidence level is below the threshold, fetch one or more instructions of the first branch instruction instance and convert the one or more instructions to predicated instruction instances, wherein the predicated instruction instances include at least a first instruction execution path associated with a first predicate and a second instruction execution path associated with a second predicate, wherein the computer usable program code configured to convert the one or more instructions comprises the computer usable program code configured to add metadata to the one or more instructions before sending the one or more instructions to an instruction decoder, the metadata to cause the instruction decoder to convert the one or more instructions to the predicated instruction instances;
ascertain a value of a condition before execution of the predicated instruction instances; and
determine whether to execute the first instruction execution path or the second instruction execution path based, at least in part, on whether the first predicate or the second predicate matches the value of the condition.

9. The computer program product of claim 8, wherein the threshold is based, at least in part, on the history of branch executions.

10. The computer program product of claim 8, wherein the computer usable program code is further configured to:
keep the history of branch executions, wherein the history indicates whether the first branch instruction instance was previously taken.

11. The computer program product of claim 8,
wherein the computer usable program code configured to fetch the one or more instructions comprises the computer usable program code configured to fetch one or more instructions of the first instruction execution path and one or more instructions of the second instruction execution path, the first instruction execution path and the second instruction execution path associated with the first branch instruction instance; and
wherein the computer usable program code configured to convert the one or more instructions comprises the computer usable program code configured to convert the one or more instructions of the first instruction execution path and the one or more instructions of the second instruction execution path to the predicated instruction instances.

12. The computer program product of claim 8, wherein the computer usable program code configured to convert the one or more instructions comprises one member of the group consisting of:
add the first predicate to one or more instructions of the first instruction execution path and adding the second predicate to one or more instructions of the second instruction execution path; and
insert selection instructions between each of the one or more instructions of the first instruction execution path and inserting selection instructions between each of the one or more instructions of the second instruction execution path.

13. The computer program product of claim 8, wherein the computer usable program code is further configured to:
determine that a second instruction instance is a second branch instruction instance;
responsive to a determination that the second instruction instance is the second branch instruction instance, obtain a second branch prediction for the second branch instruction instance and a second confidence value of the second branch prediction;
determine a second confidence level for the second branch prediction based on the second confidence value; and
responsive to a determination that the second confidence level is high, execute a third set of instructions that corresponds to the second branch prediction.

14. An apparatus comprising:
a network interface;
memory; and
a processor coupled with the network interface and the memory, configured to:
determine that a first instruction instance is a first branch instruction instance;
responsive to a determination that the first instruction instance is the first branch instruction instance, obtaining a first branch prediction for the first branch instruction instance and a first confidence level of the first branch prediction, wherein the first branch prediction and the first confidence level are based, at least in part, on a history of branch executions for a program that comprises the first branch instruction instance;

determine that the first confidence level is below a threshold;

before executing the first branch instruction instance and responsive to determining that the first confidence level is below the threshold, fetch one or more instructions of the first branch instruction instance and convert the one or more instructions to predicated instruction instances, wherein the predicated instruction instances include at least a first instruction execution path associated with a first predicate and a second instruction execution path associated with a second predicate, wherein the processor configured to convert the one or more instructions comprises the processor configured to add metadata to the one or more instructions before sending the one or more instructions to an instruction decoder, the metadata to cause the instruction decoder to convert the one or more instructions to the predicated instruction instances;

ascertain a value of a condition before execution of the predicated instruction instances; and determine whether to execute the first instruction execution path or the second instruction execution path based, at least in part, on whether the first predicate or the second predicate matches the value of the condition.

15. The apparatus of claim 14, wherein the threshold is based, at least in part, on the history of branch executions.

16. The apparatus of claim 14, wherein the processor is further configured to:

keep the history of branch executions, wherein the history indicates whether the first branch instruction instance was previously taken.

17. The apparatus of claim 14, the processor further configured to:

determine that a second instruction instance is a second branch instruction instance;

responsive to a determination that the second instruction instance is the second branch instruction instance, obtain a second branch prediction for the second branch instruction instance and a second confidence value of the second branch prediction;

determine a second confidence level for the second branch prediction based on the second confidence value; and responsive to a determination that the second confidence level is high, execute a third set of instructions that corresponds to the second branch prediction.

* * * * *